(12) United States Patent
Teramoto et al.

(10) Patent No.: US 12,090,406 B2
(45) Date of Patent: *Sep. 17, 2024

(54) INFORMATION PROCESSING PROGRAM, INFORMATION PROCESSING SERVER, AND INFORMATION PROCESSING SYSTEM

(71) Applicant: CYGAMES, INC., Tokyo (JP)

(72) Inventors: Keisuke Teramoto, Tokyo (JP); Yasuyuki Tomita, Tokyo (JP); Atsushi Yamazaki, Tokyo (JP)

(73) Assignee: CYGAMES, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/482,543

(22) Filed: Oct. 6, 2023

(65) Prior Publication Data

US 2024/0033638 A1 Feb. 1, 2024

Related U.S. Application Data

(63) Continuation of application No. 16/942,174, filed on Jul. 29, 2020, now Pat. No. 11,813,527, which is a
(Continued)

(30) Foreign Application Priority Data

Jan. 31, 2018 (JP) .................. 2018-014911

(51) Int. Cl.
*A63F 13/58* (2014.01)
*A63F 13/44* (2014.01)
*A63F 13/69* (2014.01)

(52) U.S. Cl.
CPC .............. *A63F 13/58* (2014.09); *A63F 13/44* (2014.09); *A63F 13/69* (2014.09); *A63F 2300/65* (2013.01)

(58) Field of Classification Search
CPC .......... A63F 13/58; A63F 13/44; A63F 13/69; A63F 2300/65
See application file for complete search history.

(56) References Cited

U.S. PATENT DOCUMENTS

| 2013/0217489 A1 | 8/2013 | Bronstein Bendayan et al. |
| 2013/0288757 A1 | 10/2013 | Guthridge et al. |

(Continued)

FOREIGN PATENT DOCUMENTS

| JP | 2012235871 A | 12/2012 |
| JP | 2013-202269 A | 10/2013 |

(Continued)

OTHER PUBLICATIONS

"Flower Knight's Blomaga, 727 is the Best, Team leader's level up edition" Mar. 6, 2018; Retrieved from the Internet (9 pages).

(Continued)

*Primary Examiner* — Thomas H Henry
(74) *Attorney, Agent, or Firm* — Osha Bergman Watanabe & Burton LLP (57) ABSTRACT

Provided is an information processing program for causing a computer to realize: a game execution unit (113) that consumes a first parameter to execute a first game in the case where it is determined on the basis of the first parameter that it is possible to execute the first game; a first recovery unit (115) that recovers the first parameter up to a first recovery upper-limit value as time elapses; a second recovery unit (117) that recovers a second parameter, which is different from the first parameter, up to a second recovery upper-limit value as time elapses; and an instructed recovery unit (119) that, in the case where an instruction from a player is accepted, consumes the second parameter using a second parameter consumption amount based on the current amount of the second parameter and recovers the first parameter on the basis of the consumption amount. This makes it possible (Continued)

to provide a game with which the motivation of the player to participate in the game and to continue the game can be enhanced.

7 Claims, 10 Drawing Sheets

Related U.S. Application Data continuation of application No. PCT/JP2019/003330, filed on Jan. 31, 2019.

(56) References Cited

U.S. PATENT DOCUMENTS

| | | |
|---|---|---|
| 2014/0073416 A1 | 3/2014 | Toyama |
| 2018/0261048 A1 | 9/2018 | Schultz et al. |

FOREIGN PATENT DOCUMENTS

| | | |
|---|---|---|
| JP | 2014023880 A | 2/2014 |
| JP | 2014161487 A | 9/2014 |
| JP | 2017192746 A | 10/2017 |

OTHER PUBLICATIONS

"Knight Girl strategy summary Wiki, Search" Mar. 6, 2018; Retrieved from the Internet (5 pages).

"Lineage, the Cross Rancor, episode V, Player's Bible" Feb. 14, 2007 (7 pages).

INFORMATION PROCESSING PROGRAM, INFORMATION PROCESSING SERVER, AND INFORMATION PROCESSING SYSTEM

TECHNICAL FIELD

The present invention relates to information processing programs, information processing servers, and information processing systems.

BACKGROUND ART

Generally, in a game that is provided on a smartphone or the like, there is a parameter indicating a certain cost. Furthermore, a player of the game can play the game by consuming the parameter indicating the cost. In the following, the parameter indicating the cost will be referred to as "stamina". However, the term "stamina" is just an example for the purpose of explanation, and there are cases where the parameter indicating the cost is referred to by a name other than stamina.

In the case where sufficient stamina for playing the game is not available, the player of the game continues the game by recovering the stamina. For example, the player recovers the stamina to continue the game by choosing whether to wait until the stamina is recovered as time elapses or to recover the stamina by consuming a game currency acquired with payment (Patent Literature 1).

CITATION LIST

Patent Literature

[PTL 1]
Japanese Unexamined Patent Application, Publication No. 2012-235871

SUMMARY OF INVENTION

Technical Problem

In an existing game administration device such as the one disclosed in Patent Literature 1, in the case where the player waits until the stamina is recovered as time elapses in order to play the game, it has been the case that a long time may be required before playing the game depending on a condition set for the amount of stamina that is recovered as time elapses, which might result in diminishing the motivation for participating in the game.

Furthermore, in the case where the stamina is recovered by using an item purchased by consuming a game currency acquired with payment, it has been the case that the motivation of the player to continue the game might be diminished depending on the amount of payment required for purchasing a desired item.

Accordingly, some aspects of the present invention have been made in view of the situation described above, and it is an object thereof to provide an information processing program, an information processing server, and an information processing system that provide a game with which the motivation of a player to participate in the game and to continue the game can be enhanced.

Solution to Problem

An information processing program according to an aspect of the present invention is an information processing program for causing a computer to realize: a game execution unit that consumes a first parameter to execute a first game in the case where it is determined on the basis of the first parameter that it is possible to execute the first game; a first recovery unit that recovers the first parameter up to a first recovery upper-limit value as time elapses; a second recovery unit that recovers a second parameter, which is different from the first parameter, up to a second recovery upper-limit value as time elapses; and an instructed recovery unit that, in the case where an instruction from a player is accepted, consumes the second parameter using a second parameter consumption amount based on the current amount of the second parameter and recovers the first parameter on the basis of the consumption amount.

An information processing server according to an aspect of the present invention is an information processing server including: a game execution unit that consumes a first parameter to execute a first game in the case where it is determined on the basis of the first parameter that it is possible to execute the first game; a first recovery unit that recovers the first parameter up to a first recovery upper-limit value as time elapses; a second recovery unit that recovers a second parameter, which is different from the first parameter, up to a second recovery upper-limit value as time elapses; and an instructed recovery unit that, in the case where an instruction from a player is accepted, consumes the second parameter using a second parameter consumption amount based on the current amount of the second parameter and recovers the first parameter on the basis of the consumption amount.

An information processing system according to an aspect of the present invention is an information processing system including: a terminal; and an information processing server communicatively connected to the terminal, wherein the terminal includes: an accepting unit that accepts an instruction for recovering a first parameter from a player; and a communication unit that sends the accepted instruction to the information processing server, and wherein the information processing server includes: a game execution unit that consumes the first parameter to execute a first game in the case where it is determined on the basis of the first parameter that it is possible to execute the first game; a first recovery unit that recovers the first parameter up to a first recovery upper-limit value as time elapses; a second recovery unit that recovers a second parameter, which is different from the first parameter, up to a second recovery upper-limit value as time elapses; and an instructed recovery unit that, in the case where the instruction is accepted, consumes the second parameter using a second parameter consumption amount based on the current amount of the second parameter and recovers the first parameter on the basis of the consumption amount.

A "player" refers to a user who operates a terminal device, and is also a concept corresponding to a client in what is called a client-server system. Furthermore, generally, a player may participate in a game via what is called a player character that is engaged in activities, take actions, and so forth in a virtual game space instead of the player himself or herself, or via a suitable game medium associated with the player character.

A "parameter" refers to information that is managed in association with a player in a game. For example, a parameter refers to information relating to the progress of a game, such as stamina indicating the physical strength in the game or a game currency. The parameter is determined in accordance with the content of game play. The parameter is determined, for example, on the basis of the difficulty or importance of game play. Stamina may be recovered as time elapses, as a result of succeeding in an event generated in the game, as the level of the player is improved (status improvement), or by using an acquired item, which will be described later. The game currency may be acquired on the basis of payment for the game by the user, success in an event, an improvement in the level of the player, etc.

An "item" refers to information that is managed in association with a player in a game and that is different from a "parameter". For example, an item refers to something generating an effect that brings about an advantage in proceeding with a game in which the player participates, relative to other players or enemy characters in the game, or something that enhances a value or a sense of value when it is acquired or owned, and the kinds thereof are not particularly limited. Examples of items include various items for recovering the stamina of the player. However, without limitation to those items, examples of items may include various items for enhancing the attacking ability of the player and various items for increasing damage to other players and enemy characters in the game.

It is to be noted that, in the present invention, a "unit" does not simply refer to a physical means but also includes the case where the functionality of the "unit" is realized by software. Furthermore, the functionality of one "unit" or device may be realized by two or more physical means or devices, and the functionality of two or more "units" or devices may be realized by a single physical means or device.

Advantageous Effects of Invention

The present invention provides a game with which the motivation of a player to participate in the game and to continue the game can be enhanced.

DESCRIPTION OF EMBODIMENTS

An embodiment of the present invention will be described below with reference to the accompanying drawings. The following embodiment is an example for explaining the present invention, and it is not intended to limit the present invention only to this embodiment. Furthermore, the present invention can be modified in various forms not departing from the gist thereof. Furthermore, the same reference signs are attached to the same components throughout the drawings wherever possible, and repeated descriptions will be omitted.

Figure 1:
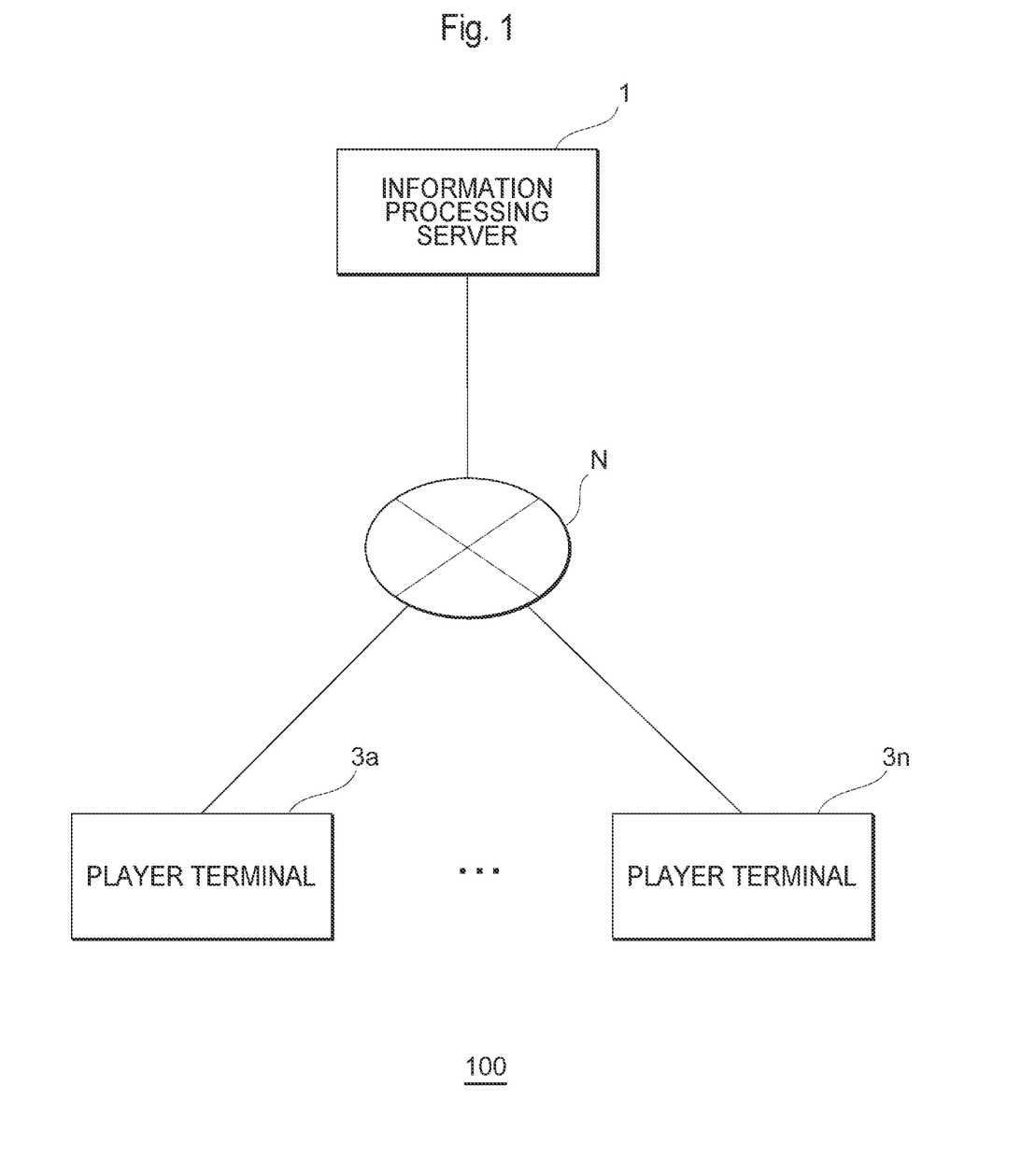
FIG. 1 is a schematic configuration diagram (system configuration diagram) of an information processing system according to an embodiment of the present invention.

FIG. 1 is a block diagram showing the overall configuration of an information processing system 100 according to this embodiment. As shown in FIG. 1, as an example, the information processing system 100 is configured to include an information processing server 1, n (n is an arbitrary integer greater than or equal to 1) player terminals 3, and a network N.

The information processing system 100 is what is called a client-server system. The information processing system 100 is realized by mutually carrying out communication between the n player terminals 3 acting as clients and the information processing server 1 via the network N.

The information processing server 1 is realized, for example, by a server device. Furthermore, the player terminals 3 are realized, for example, by smartphones, game machines, or personal computers. Furthermore, the network N is realized, for example, by a network such as the Internet or a mobile phone network, a LAN (Local Area Network), or a network formed by combining these types of networks.

In the drawings, a player terminal 3a and a player terminal 3n are shown as the n player terminals 3. In the following description, however, these n player terminals 3 will be simply referred to as the "player terminals 3", with the reference signs partially omitted, in the case where no distinction is made thereamong.

Figure 2:
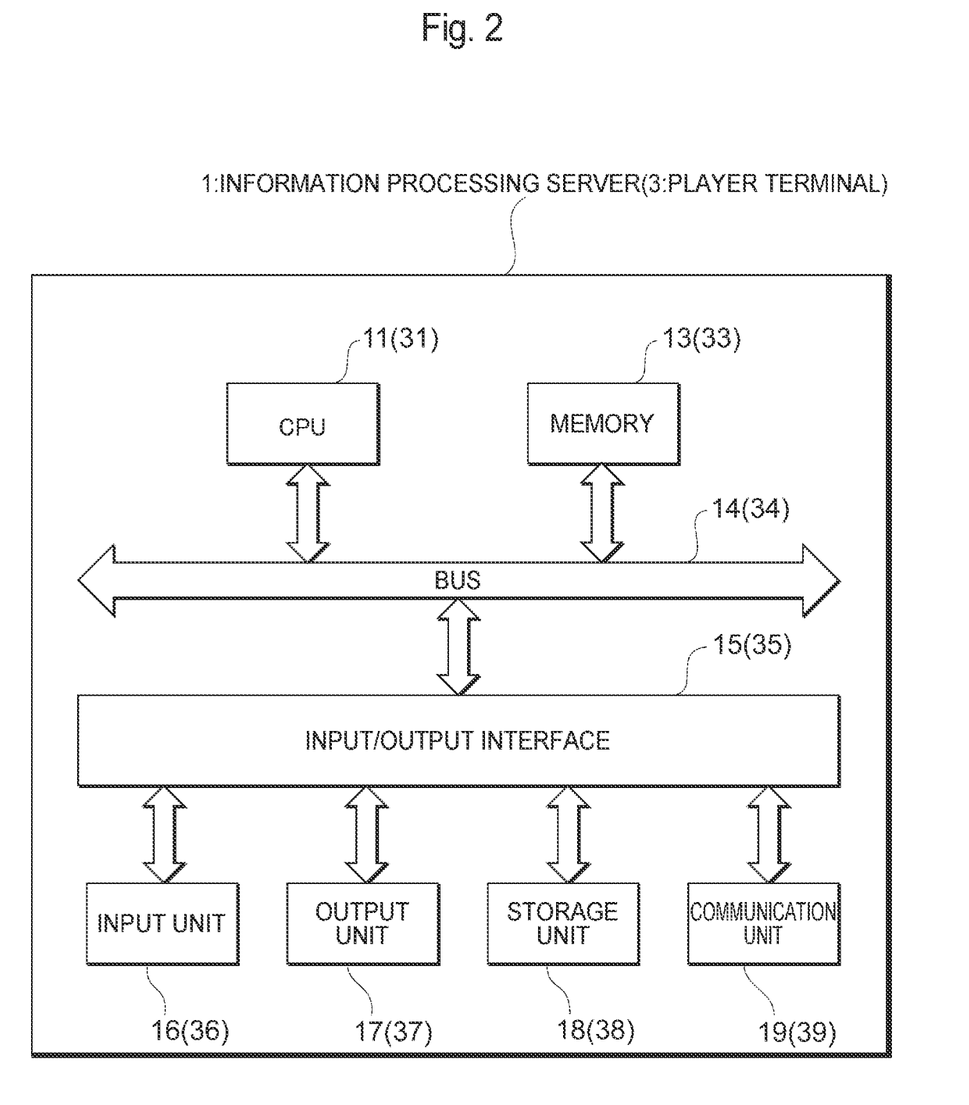
FIG. 2 is a schematic configuration diagram (block diagram) of an information processing server and a player terminal according to the embodiment of the present invention.

FIG. 2 is a block diagram showing the hardware configuration of the information processing server 1 and the hardware configuration of the player terminal 3 according to the embodiment of the present invention. In the figure, reference signs corresponding to the hardware of the information processing server 1 are shown without adding parentheses, and reference signs corresponding to the hardware of the player terminal 3 are shown with added parentheses.

As an example, the information processing server 1 includes a CPU (Central Processing Unit) 11, a memory 13 constituted of a ROM (Read Only Memory) 12, a RAM (Random Access Memory), etc., a bus 14, an input/output interface 15, an input unit 16, an output unit 17, a storage unit 18, and a communication unit 19.

The CPU 11 executes various kinds of processing according to programs recorded in the memory 13 or programs loaded from the storage unit 18 into the memory 13.

The memory 13 also stores, as appropriate, data, etc. needed for the execution of various kinds of processing by the CPU 11. The CPU 11 and the memory 13 are connected to each other via the bus 14. The input/output interface 15 is also connected to the bus 14. The input unit 16, the output unit 17, the storage unit 18, and the communication unit 19 are connected to the input/output interface 15.

The input unit 16 is formed of various kinds of buttons, a touchscreen, a microphone, or the like, and accepts input of various kinds of information in accordance with instruction operations performed by the administrator of the information processing server 1 or the like. Alternatively, the input unit 16 may be realized by an input device, such as a keyboard or a mouse, that is independent of a main unit accommodating the other units of the information processing server 1.

The output unit 17 is formed of a display, a speaker, or the like, and outputs image data or music data. The image data or music data output from the output unit 17 is output from the display, the speaker, or the like in a form recognizable by a player, as an image or music.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the player terminals 3 via the network N.

Furthermore, although not shown, a drive is provided, as needed and as appropriate, in the information processing server 1. For example, a removable medium formed of a magnetic disk, an optical disk, a magneto-optical disk, a semiconductor memory, or the like is loaded in the drive, as appropriate. The removable medium stores a program for executing a game and various kinds of data, such as image data. The program and the various kinds of data, such as image data, read by the drive from the removable medium, are installed in the storage unit 18, as needed.

Next, the hardware configuration of the player terminal 3 will be described. As shown in FIG. 2, as an example, the player terminal 3 includes a CPU 31, a memory 33, a bus 34, an input/output interface 35, an input unit 36, an output unit 37, a storage unit 38, and a communication unit 39. These units individually have functions equivalent to those of the units having the same names and different reference signs in the information processing server 1 described above. Thus, repeated descriptions will be omitted.

Figure 3:
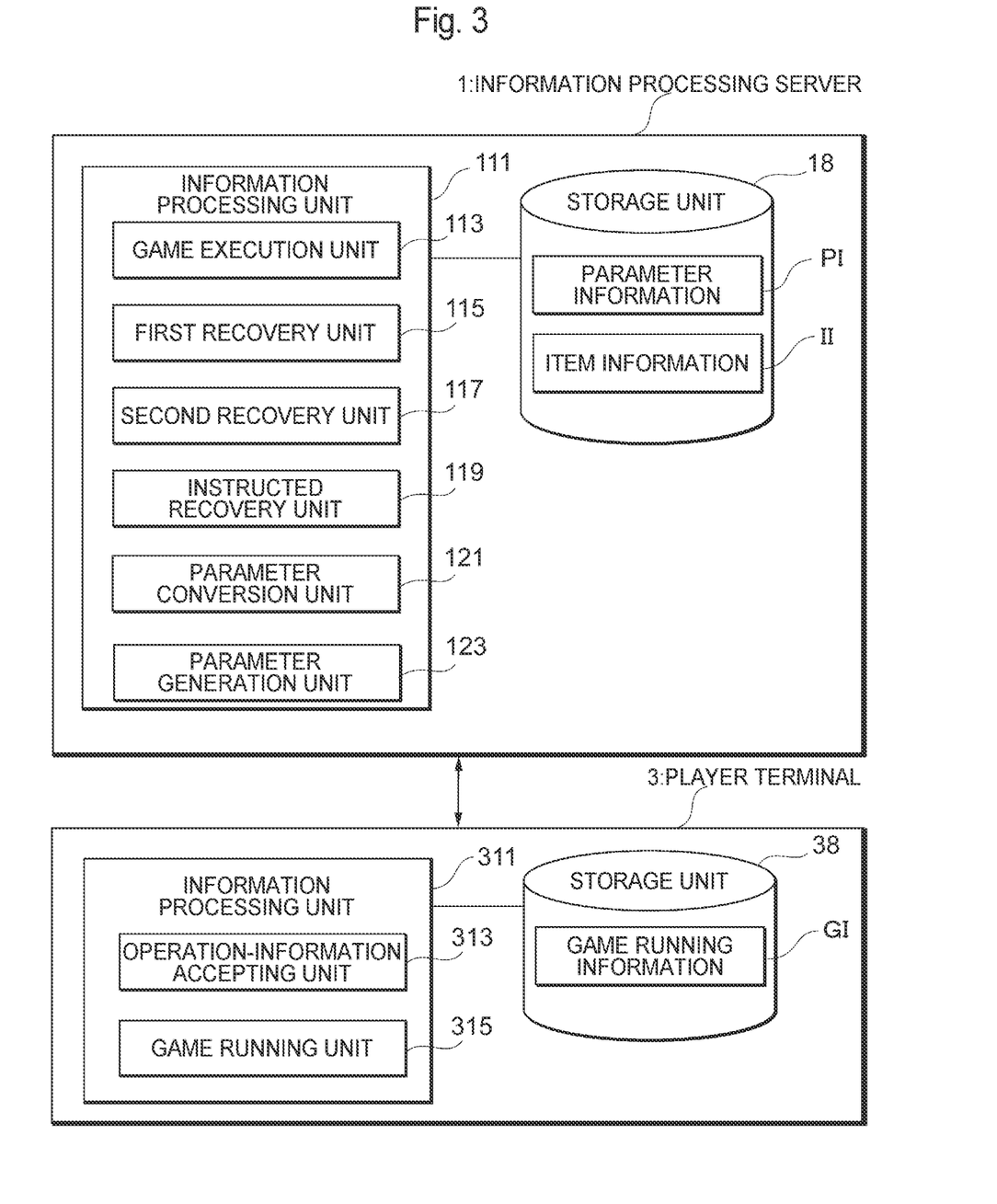
FIG. 3 is a schematic configuration diagram (block diagram) showing an example of the functional configurations of the information processing server and the player terminal according to the embodiment of the present invention.

FIG. 3 is a block diagram showing an example of the functional configuration of the information processing server 1 and the functional configuration of the player terminal 3 according to the embodiment of the present invention. As shown in FIG. 3, as an example, the information processing server 1 is configured to include an information processing unit 111 that executes a stamina recovery process for recovering the stamina (a parameter) of a player in a game and the storage unit 18 that records information needed for the stamina recovery process and information generated as a result of the stamina recovery process.

The information processing unit 111 is functionally configured to include, for example, a game execution unit 113, a first recovery unit 115, a second recovery unit 117, an instructed recovery unit 119, a parameter conversion unit 121, and a parameter generation unit 123. These units of the information processing unit 111 can be realized, for example, by the CPU 11 executing programs stored in the memory 113 or the storage unit 18 shown in FIG. 2.

The game execution unit 113 is a unit that mainly executes game execution processing. Specifically, the game execution unit 113 executes a first game while consuming main stamina in the case where it is determined on the basis of the main stamina (first parameter) that it is possible to execute the first game.

Specifically, in the case where an amount of main stamina needed for executing the first game is available, the game execution unit 113 updates the value of the main stamina included in parameter information PI stored in the storage unit 18, which will be described later, by decreasing the value of the main stamina by the amount needed for executing the first game. In addition, the game execution unit 113 sends an instruction for executing the first game and the updated value of the main stamina to a game running unit 315 of the player terminal 3 as a response to a request for executing the first game. The game running unit 315 may update the values of the stamina in the first game being executed by the game running unit 315 and execute the first game in accordance with this response.

Meanwhile, in the case where the needed amount of main stamina for executing the first game is not available, for example, the game execution unit 113 may send an instruction for prohibiting the execution of the first game to the game running unit 315 of the player terminal 3.

The amount of main stamina that is decreased as a result of a game (i.e., the amount of main stamina that is consumed) is determined on the basis of the content of the game. For example, the amount is determined on the basis of the difficulty or importance of the game. Furthermore, the amount of main stamina that is decreased as a result of a game may be a uniform amount among games but also may be different amounts for individual games. For example, for a game having higher difficulty or importance than other games, the amount of stamina that is decreased for the game may be greater compared with the other games. Meanwhile, for example, for a game having lower difficulty or importance than other games, the amount of main stamina that is decreased for the game be less compared with the other games.

The first recovery unit 115 and the second recovery unit 117 execute a stamina recovery process (temporal recovery process) in which the stamina is recovered as time elapses. Specifically, the first recovery unit 115 recovers the main stamina to a first recovery upper-limit value as time elapses. The first recovery upper-limit value of the main stamina may be changed on the basis of changes in data associated with the player (e.g., changes in the player level). The second recovery unit recovers stock stamina (second parameter), which is different from the main stamina (first parameter), to a second recovery upper-limit value as time elapses. The second recovery upper-limit value for the stock stamina may be changed on the basis of changes in the status of items (e.g., changes in item levels). In the following description, the "main stamina" and the "stock stamina" will simply be referred to as the "stamina" in the case where no distinction is made therebetween.

The main stamina is stamina that is consumed when a game is executed, as mentioned above. Meanwhile, the stock stamina is stamina that plays an auxiliary role with the main stamina; specifically, the stock stamina is stamina that is consumed when recovering the main stamina on the basis of an instruction from a player. Although specific numerical values are given for the values of the stamina and the values of the amounts of recovery of the stamina in the following description, those numerical values are only examples for the purpose of description. The values of the stamina and the values of the amounts of recovery of the stamina may be set arbitrarily, without limitation to the examples given below.

Figure 4:
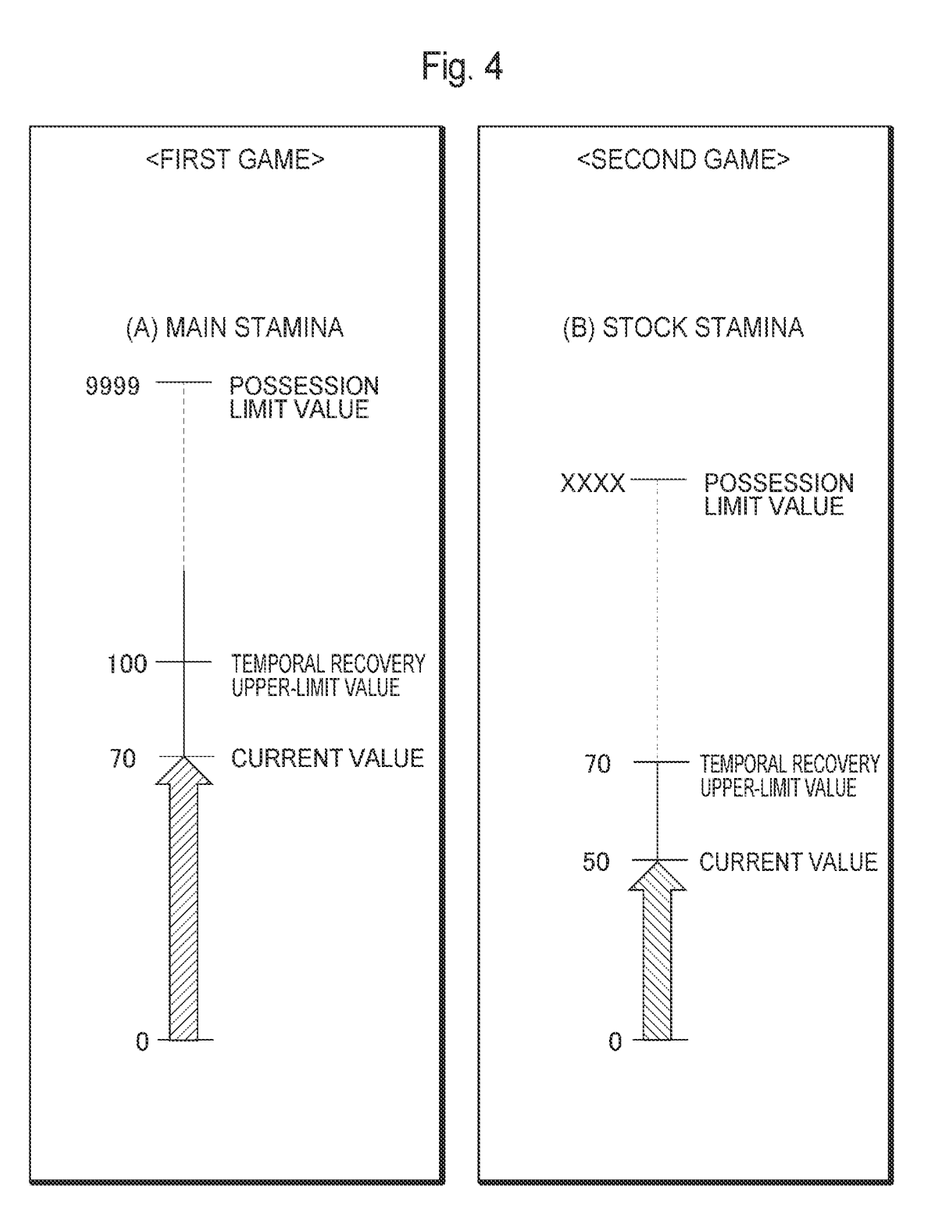
FIG. 4 is a flowchart showing an example of a temporal recovery process according to the embodiment of the present invention, in which stamina is recovered as time elapses.

FIG. 4 shows an example of the relationship between the values of the main stamina and the stock stamina and the temporal recovery process according to the embodiment of the present invention. As shown in FIG. 4, for example, the first recovery unit 115 and the second recovery unit 117 shown in FIG. 3 recovers the stamina by a preset period by increasing the values of the stamina included in the parameter information PI stored in the storage unit 18. This temporal recovery process does not particularly require any operation by a player and is performed as time elapses.

For example, every predetermined time duration (e.g., "every five minutes"), the first recovery unit 115 updates the value of the main stamina included in the parameter information PI stored in the storage unit 18 by increasing the value by a predetermined value (e.g., "1"), thereby realizing the temporal recovery process. Furthermore, every predetermined time duration (e.g., "every one hour"), the second recovery unit 117 updates the value of the stock stamina included in the parameter information PI stored in the storage unit 18 by a predetermined value (e.g., "1"), thereby realizing the temporal recovery process. That is, the recovery rate of the stock stamina (second parameter) with the elapse of time is slower than the recovery rate of the main stamina (first parameter) with the elapse of time. Alternatively, the recovery rate of the stock stamina (second parameter) with the elapse of time may be set to be faster than the recovery rate of the main stamina (first parameter) with the elapse of time.

It is to be noted that the temporal recovery process is not executed without any limit. The first recovery unit 115 and the second recovery unit 117 do not execute the temporal recovery process in the case where the stamina value exceeds a temporal recovery upper-limit value (e.g., "100" for the main stamina and "70" for the stock stamina).

Furthermore, the first recovery unit 115 and the second recovery unit 117 send the updated stamina values to the game running unit 315 of the player terminal 3. The game running unit 315 updates the stamina values in the game being executed by the game running unit 315 on the basis of the received updated stamina values.

The stock stamina is managed on a second game, which can be executed without consuming the main stamina. Furthermore, the stock stamina is managed on the second game, which is different from the first game executed while consuming the main stamina and which proceeds along the same time axis as the first game. Game data of both the first game and the second game is maintained and managed by the common information processing server 1. In the first game and the second game, elapse-of-time processing may be executed by using a shared timer. By managing the stock stamina independently of the main stamina, as described above, while executing the first game by using the main stamina, when the amount of main stamina has become small, the player executes a stamina recovery process (instructed recovery process) in which the stamina is recovered according to an instruction from the player, which will be described later, concurrently with the temporal recovery process or independently of the temporal recovery process.

Here, examples of the first game include a game in which characters or items are raised by clearing predetermined challenges (quests), a game in which a player organizes a party by using an owned character and plays battles against enemy characters, and a rhythm game in which a player organizes a party by using an owned character to play the game. Furthermore, examples of the first game may include various kinds of games, such as action games, quiz games, pinball games, and card games. Any of these types of the first game requires consumption of the main stamina during execution.

Examples of the second game may include a game in which a player appreciates owned characters, a room creating game in which a room for a character is created, a town creating game, a game in which the player tries to increase the value of a parameter, such as the likeability of a character, and a game in which characters or items are raised by a predetermined method. None of these types of the second game require consumption of the main stamina during execution. Furthermore, predetermined data associated with a player, such as the characters or items owned by the player, may be shared between the first game and the second game.

Referring back to FIG. 3, the instructed recovery unit 119 executes a stamina recovery process (instructed recovery process) in which the stamina is recovered according to an instruction from the player. Specifically, according to an instruction from the player, the instructed recovery unit 119 consumes the stock stamina (second parameter) and recovers the main stamina (first parameter) on the basis of the amount of consumption of the stock stamina (first parameter).

Figure 5:
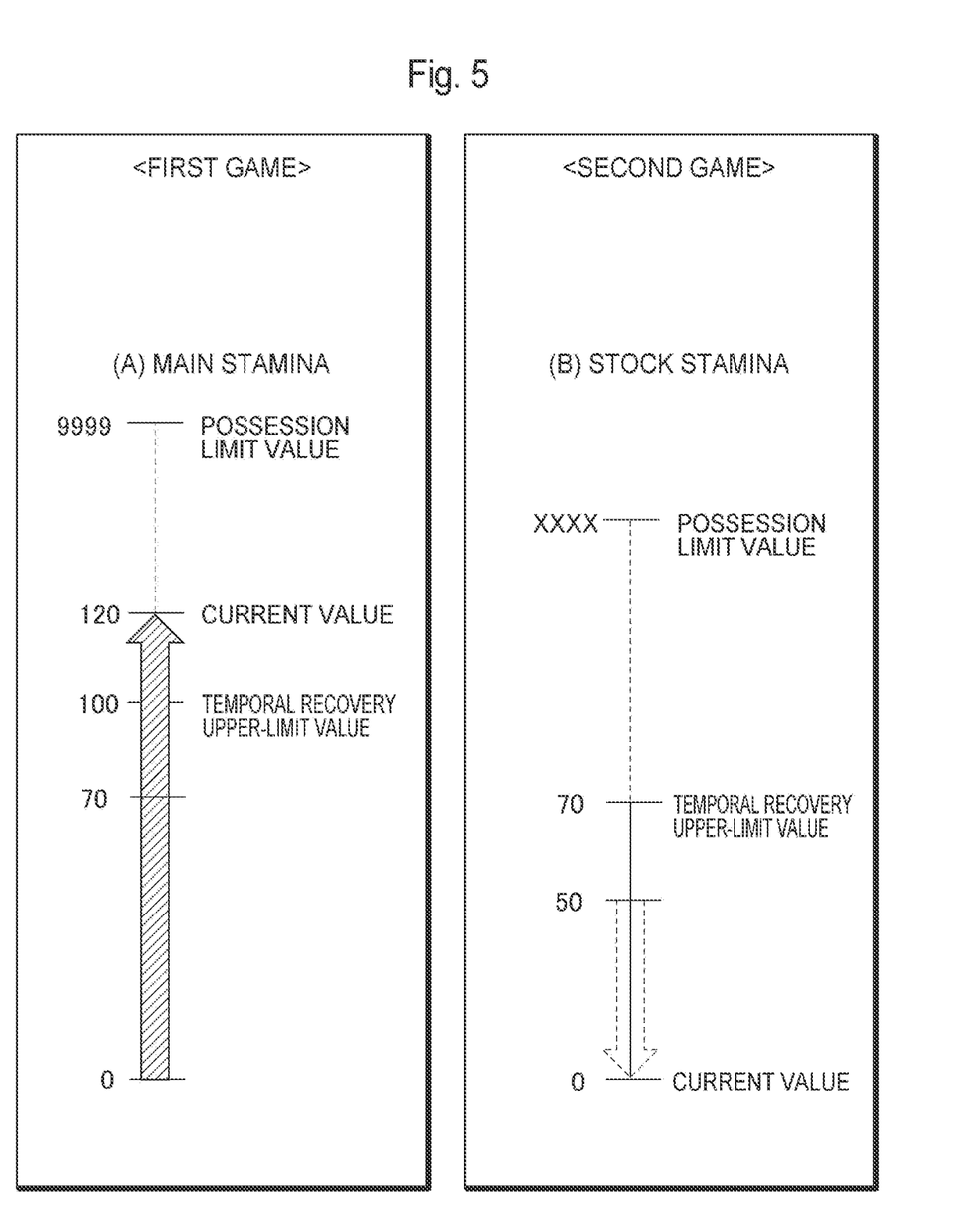
FIG. 5 is a flowchart showing an example of an instructed recovery process according to the embodiment of the present invention, in which stamina is recovered according to an instruction from a player.

FIG. 5 shows an example of the relationship between the values of the main stamina and the stock stamina and the instructed recovery process according to the embodiment of the present invention. As shown in FIG. 5, according to an instruction from the player, the instructed recovery unit 119 the stock stamina value "50" included in the parameter information PI stored in the storage unit 18 to "0" (consumes all the stock stamina) to increase (recover) the main stamina value from "70" to "120". The specific processing in the instructed recovery process will be described later.

Note that the "possession limit values" of the main stamina and the stock stamina are upper-limit values of stamina that are set in the information processing system according to this embodiment, and do not vary even when an item is used or the level of the player is improved. Furthermore, the different values may be set or the same value may be set as the "possession limit values" for the main stamina and the stock stamina.

Referring back to FIG. 3, in the case where the possession limit value of the first parameter, which is greater than or equal to the first recovery upper-limit value, would be exceeded if the first parameter were recovered on the basis of the second parameter consumption amount, the parameter conversion unit 121 (conversion unit) converts the second parameter into an item that makes it possible to recover the first parameter.

The parameter generation unit 123 generates stock stamina (second parameter) corresponding to a specific item on the basis of that specific item.

The storage unit 18 stores, for example, parameter information PI indicating parameters in the game that is executed by the game execution unit 113, such as stamina and a currency in the game, as well as item information II indicating various items in the game that is executed by the game execution unit 113.

Next, as an example, the player terminal 3 is configured to include an information processing unit 311 that manages the proceeding of the game and the storage unit 38 that stores information needed for the proceeding of the game.

The information processing unit 311 is configured to functionally include, for example, an operation-information accepting unit 313 and a game running unit 315. These units of the information processing unit 311 can be realized, for example, by the CPU 31 executing programs stored in the memory 33 or the storage unit 38 shown in FIG. 2.

The operation-information accepting unit 313 accepts operations relating to the game from the player. The operation-information accepting unit 313 accepts operations relating to the game, performed by the player via the input unit 36. Then, the operation-information accepting unit 313 outputs the contents of the accepted operations to the game running unit 315.

The game running unit 315 executes processing for running the game. The game running unit 315 runs the game on the basis of game software included in game running information GI stored in the storage unit 38 and the contents of player operations input from the input unit 36 shown in FIG. 2.

As the game is run, the game running unit 315 executes control processing for generating game images from image data included in the game running information GI and outputting the generated images to the output unit 37. Similarly, as the game is run, the game running unit 315 executes control processing for generating game music and audio from music data and audio data included in the game running information GI and outputting the generated music and audio from the output unit 37.

As described earlier, predetermined parameters in the game run by the game running unit 315 are managed by the information processing server 1. For example, parameters such as stamina in the game and a game currency in the game are managed by the information processing server 1. Thus, in the case where processing involving changes in these predetermined parameters (i.e., processing involving increases or decreases in the values of the parameters) occurs in the game, the game running unit 315 carries out communication with the information processing server 1 to update the parameters managed by the information processing server 1. Then, the game running unit 313 receives the updated parameters from the information processing server 1 and continues to run the game on the basis of the updated parameters.

<Temporal Recovery Process>

Figure 6:
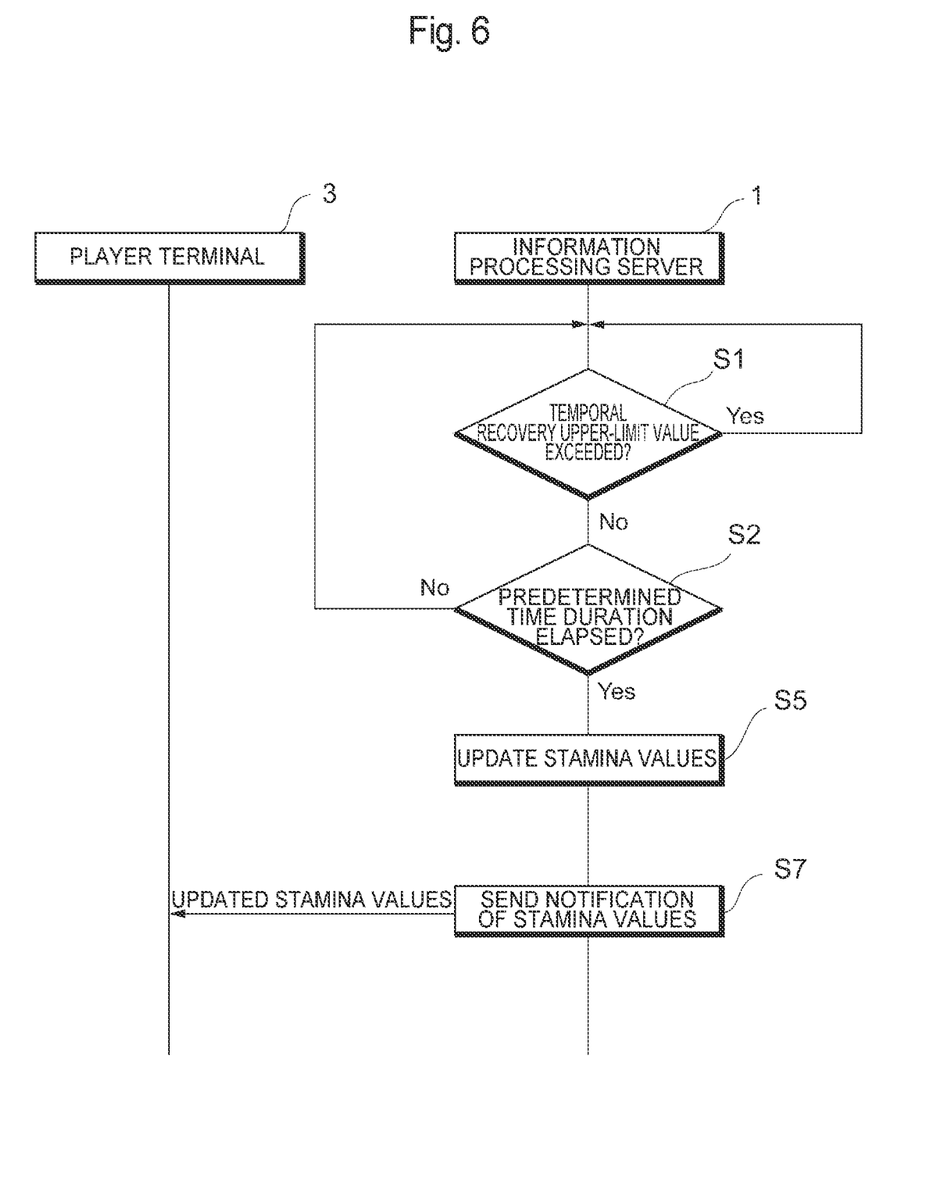
FIG. 6 shows an example of the relationship between stamina values and the temporal recovery process according to the embodiment of the present invention.

A stamina recovery process (temporal recovery process) in which the stamina is recovered as time elapses will be described with reference to FIG. 6. FIG. 6 is a flowchart showing an example of the temporal recovery process according to the embodiment of the present invention. Since the first recovery unit 115 and the second recovery unit 117 execute similar temporal recovery processes, the following description will be given in the context of only the first recovery unit 115 as an example.

(Step S1)

The first recovery unit 115 shown in FIG. 3 determines whether or not the value of the main stamina exceeds a temporal recovery upper-limit value in the case where the value of the main stamina included in the parameter information PI stored in the storage unit 18 is increased by a predetermined value (e.g., "1"). In the case where the temporal recovery upper-limit value is exceeded, the determination in step S1 results in Yes, and the determination in step S1 is performed repeatedly. Meanwhile, in the case where the temporal recovery upper-limit value is not exceeded, the process proceeds to step S3.

(Step S3)

The first recovery unit 115 determines whether or not a predetermined time duration (e.g., "five minutes") has elapsed since the main stamina was recovered through the previous temporal recovery process or since the main stamina was consumed as a result of the previous game execution. In the case where the predetermined time duration has not elapsed, the determination in step S3 results in No, and the process returns to step S1 without increasing the value of the main stamina. Meanwhile, in the case where the predetermined time duration has elapsed, the determination in step S3 results in Yes, and the process proceeds to step S5.

(Step S5)

The first recovery unit 115 realizes the temporal recovery process by increasing the value of the main stamina included in the parameter information PI stored in the storage unit 18 by a predetermined value (e.g., "1") to update the value of the main stamina.

(Step S7)

The first recovery unit 115 sends the updated value of the main stamina to the game running unit 315 of the player terminal 3. The game running unit 315 updates the value of the main stamina in the game being executed by the game running unit 315 on the basis of the received updated value of the main stamina.

<Instructed Recovery Process>

Figure 7:
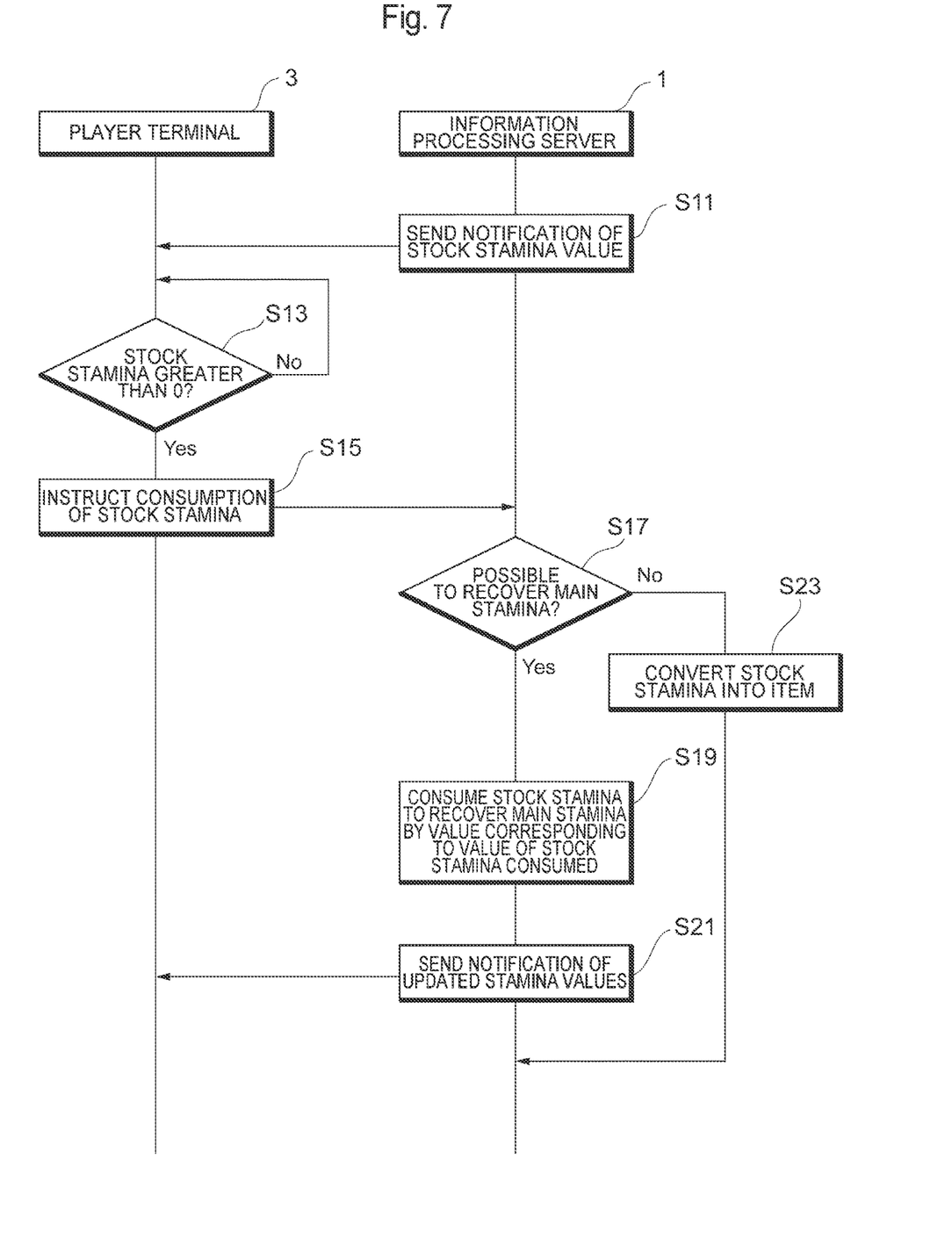
FIG. 7 shows an example of the relationship between stamina values and the instructed recovery process according to the embodiment of the present invention.

A stamina recovery process (instructed recovery process) in which the stamina is recovered according to an instruction from a player will be described with reference to FIGS. 7 to 10. FIG. 7 is a flowchart showing an example of the instructed recovery process according to the embodiment of the present invention. The temporal recovery process described above may be executed concurrently with the instructed recovery process, or control may be executed so as not to execute the temporal recovery process while the instructed recovery process is being executed.

(Step S11)

The game execution unit 113 of the information processing server 1, shown in FIG. 3, reads the value of the stock stamina included in the parameter information PI stored in the storage unit 18 and notifies the player terminal 3 of the value of the stock stamina.

(Step S13)

The game running unit 315 of the player terminal 3, shown in FIG. 3, determines whether or not the value of the stock stamina is greater than a setting value. That is, the game running unit 315 determines whether or not stock stamina is stored to such a degree that it is possible to recover the main stamina. For example, the game running unit 315 determines whether or not the value of the stock stamina is greater than "0" and proceeds to step S15 if the value is greater (case of Yes). In the case where the value of the stock stamina is less than "0" (case of No), the process is repeated until stock stamina is stored. The setting value is not limited to "0", and a value greater than or equal to "1" may be set.

(Step S15)

The operation-information accepting unit 313 of the player terminal 3, shown in FIG. 3, accepts, from the player, an instruction for consuming the stock stamina to recover the main stamina. For example, the player operates the player terminal 3 so as to move from the first game in which the player is currently participating to the second game and so as to recover the main stamina by consuming the stock stamina managed in the second game.

Figure 8:
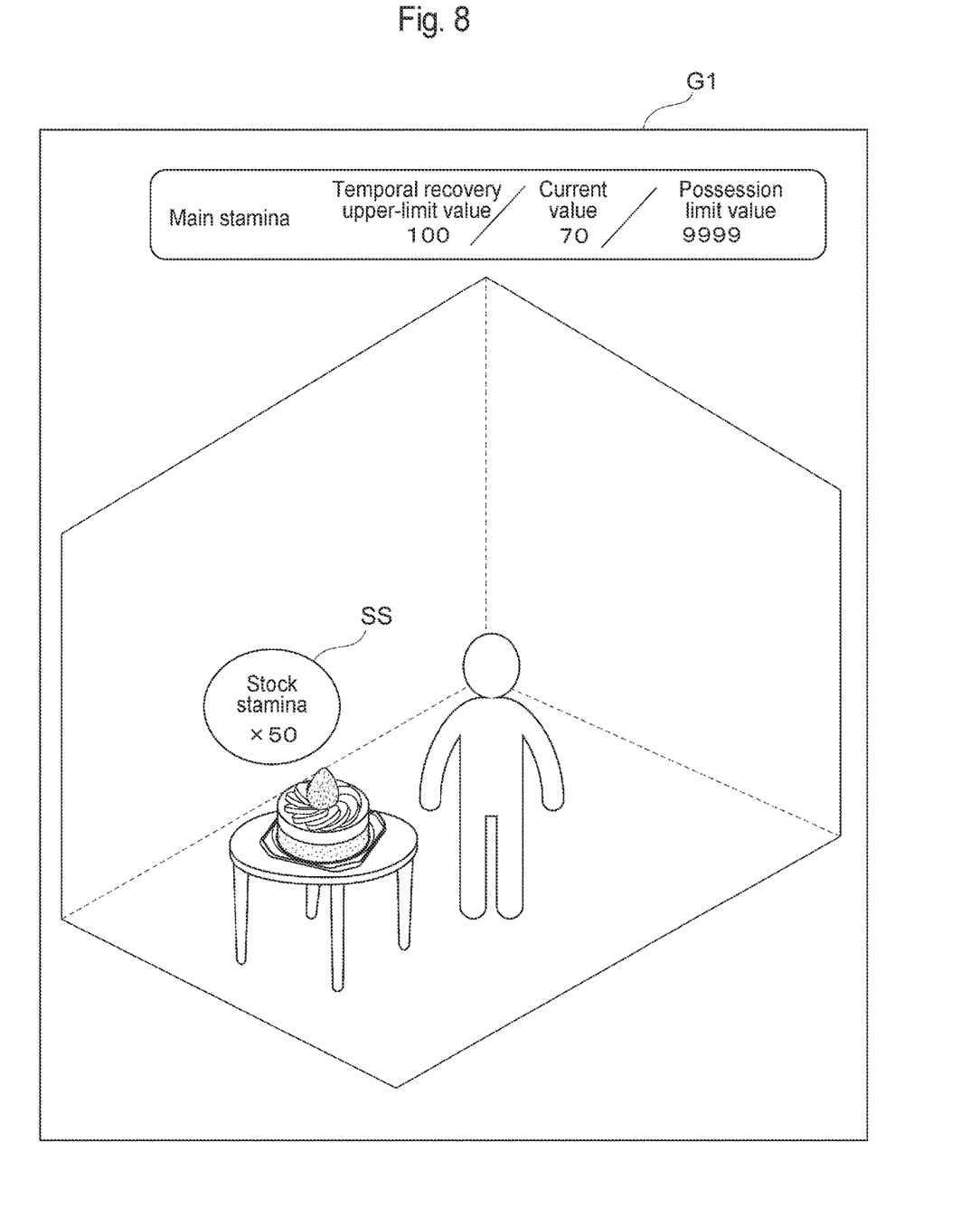
FIG. 8 shows an example of the screen of an output unit of the player terminal according to the embodiment of the present invention.

FIG. 8 shows an example of a second game screen that is output from the output unit of the player terminal according to the embodiment of the present invention. As shown in FIG. 8, for example, when the player selects a stock stamina image SS on a second game screen G1 by a click operation, the operation-information accepting unit 313 accepts an instruction for consuming the stock stamina to recover the main stamina, and the game running unit 315 transfers the instruction to the information processing server 1.

(Step S17)

When the instruction from the player terminal 3 is accepted, the instructed recovery unit 119 of the information processing server 1, shown in FIG. 3, determines whether or not it is possible to recover the main stamina.

Specifically, the instructed recovery unit 119 sets a consumption amount of the stock stamina on the basis of the current amount of the stock stamina (second parameter). For example, the instructed recovery unit 119 may set an amount corresponding to the current amount of the stock stamina as the consumption amount of the stock stamina. Then, after recovering the main stamina (first parameter) on the basis of the consumption amount of the stock stamina, the instructed recovery unit 119 determines whether or not the possession limit value of the main stamina, which is greater than or equal to the first recovery upper-limit value indicating an upper limit to which it is possible to recover the main stamina as time elapses, is exceeded. In the example in FIG. 8, even if the current value "70" of the main stamina is recovered by "50" on the basis of a consumption amount "50" of the stock stamina, the value of the main stamina after the recovery is "120". Thus, since the value of the main stamina after the recovery does not exceed the possession limit value "9999" of the main stamina (case of Yes), the instructed recovery unit 119 proceeds to step S19 in order to execute processing for recovering the main stamina.

Meanwhile, in the case where the possession limit value is exceeded if the main stamina (first parameter) is recovered on the basis of the consumption amount of the stock stamina (second parameter) (case of No), the processing for recovering the main stamina is cancelled, and the process proceeds to step S23.

(Steps S19 and S21)

The instructed recovery unit 119 decreases the value "50" of the stock stamina included in the parameter information PI stored in the storage unit 18 to "0" (consumes all the stock stamina) to increase (recover) the value of the main stamina from "70" to "120". Furthermore, the instructed recovery unit 119 sends the value "120" of the main stamina after the recovery and the value "0" of the stock stamina after the consumption to the game running unit 315 of the player terminal 3. The game running unit 315 updates the values of the main stamina and the stock stamina in the game being executed by the game running unit 315 on the basis of the received updated values of the main stamina and the stock stamina.

Figure 9:
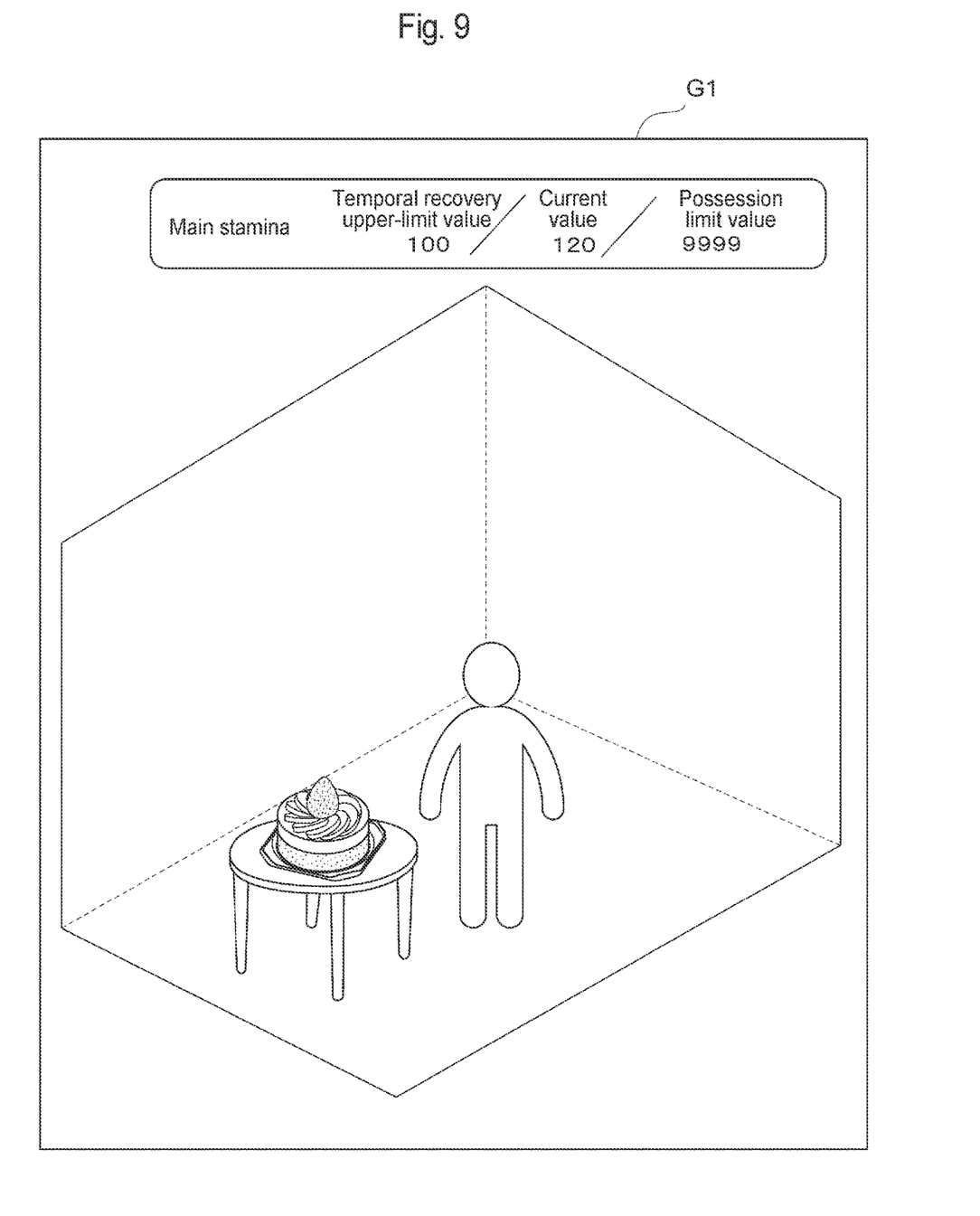
FIG. 9 shows an example of the screen of an output unit of the player terminal according to the embodiment of the present invention.

FIG. 9 shows an example of a second game screen that is output from the output terminal of the player terminal according to the embodiment of the present invention. As shown in FIG. 9, the instructed recovery unit 119 decreases the value "50" of the stock stamina to "0" (consumes all the stock stamina) to increase (recover) the value of the main stamina from "70" to "120".

It is to be noted that consuming the stock stamina is not limited to consuming all of the current amount of the stock stamina and may include consuming at least a portion of the current amount. For example, it is possible to use "40" in order to recover the main stamina out of the current amount "50" of the stock stamina and to convert the remaining "10" into an item. The instructed recovery unit 119 is not allowed to set an amount exceeding the current amount of the stock stamina as a consumption amount of the stock stamina.

(Step S23)

In the case where the possession limit value would be exceeded if the main stamina (first parameter) were recovered on the basis of the consumption amount of the stock stamina (second parameter) (case of No in step S17), the parameter conversion unit 121 shown in FIG. 3 converts the stock stamina into an item that makes it possible to recover the main stamina. The parameter conversion unit 121 stores the converted item as item information II in the storage unit 18.

Figure 10:
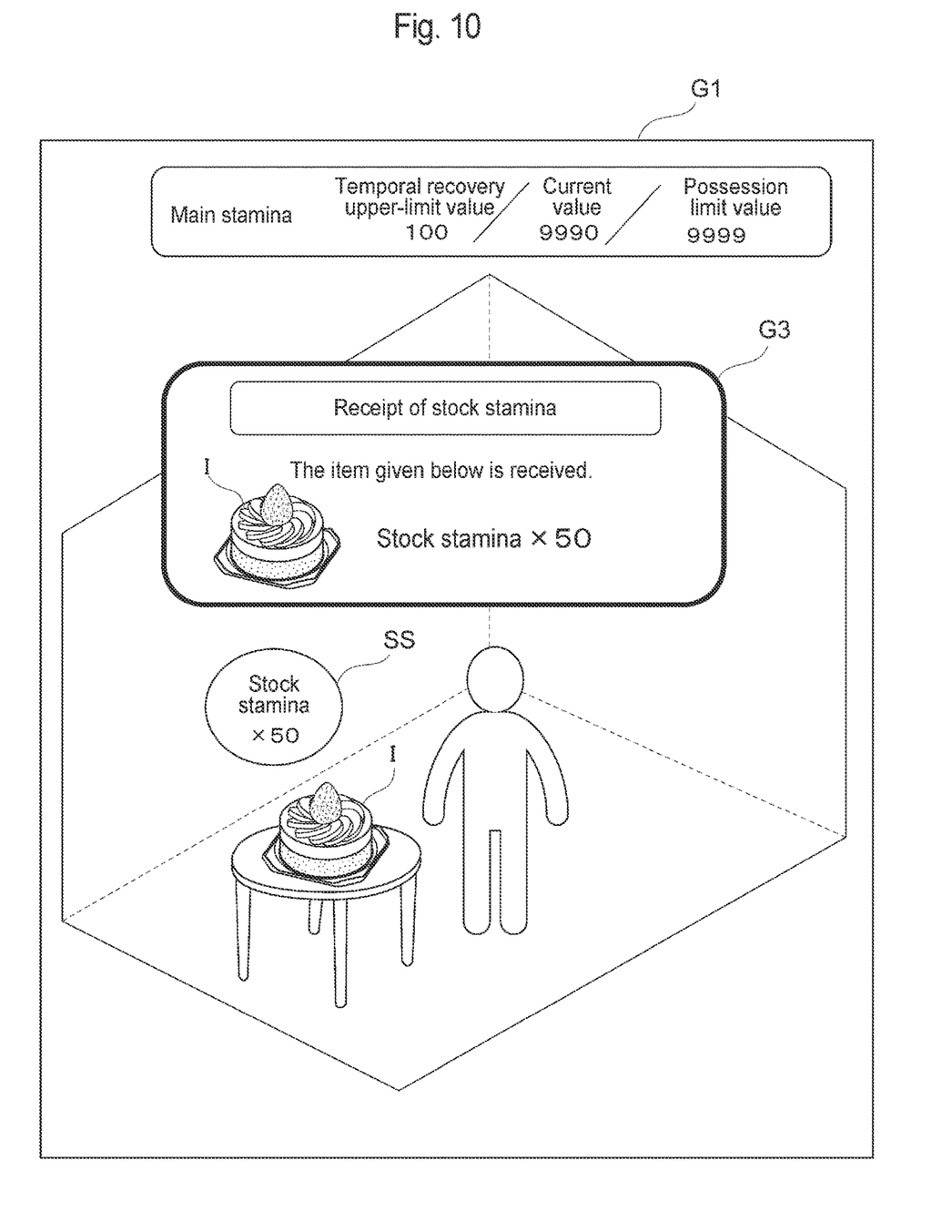
FIG. 10 shows an example of the screen of an output unit of the player terminal according to the embodiment of the present invention.

FIG. 10 shows an example of the screen of the output unit of the player terminal according to the embodiment of the present invention. As shown in FIG. 10, since the main stamina would become "10040" if the main stamina "9990" were recovered on the basis of the consumption amount "50" of the stock stamina, exceeding the possession limit value "9999", the parameter conversion unit 121 converts all the stock stamina "50" into an item I that makes it possible to recover the main stamina and provides the item I to the player. For example, when the item I is acquired, the output unit 37 in FIG. 3 may output an item acquisition screen G3 in a manner superimposed on the second game screen G1 or instead of the second game screen G1.

With this configuration, it is possible to keep an item acquired through the conversion processing by the parameter conversion unit 121 for a certain period without using the item. Thus, the player can consume the item to recover the main stamina at arbitrary timing.

It is to be noted that converting the stock stamina into the item I is not limited to converting all of the stock stamina into the item I and may include consuming at least a portion thereof. For example, it is possible to use "9" in order to recover the main stamina out of the stock stamina "50" and to convert the remaining "41" into the item I. Furthermore, a usage period may be set for an item such that the item vanishes when the usage period expires.

According to the above-described embodiment of the present invention, in order to replenish the main stamina that has decreased as a result of the first game, it is possible for the player to consume the stock stamina in which a desired amount of stamina has already been accumulated and to recover the main stamina. Thus, it is possible to execute the game at a timing desired by the player, and it is also possible to continue the game without requiring charging. This makes it possible to provide a game with which the motivation for the player to participate in the game and to continue the game can be enhanced.

It is to be noted that the above-described embodiments are presented to facilitate the understanding of the present invention and should not be construed to limit the present invention. The present invention can be modified or improved without departing from the gist thereof, and the present invention encompasses equivalents thereof.

For example, the parameter generation unit 123 shown in FIG. 3 generates stock stamina (second parameter) corresponding to a specific item on the basis of that specific item. For example, the parameter generation unit 123 may be configured to generate new stock stamina for recovering the main stamina, which is different from the stock stamina associated with the item I, on the basis of a specific item other than the item I shown in FIG. 10. Similarly to the other stock stamina, the newly generated stock stamina is set so as to be recovered to a recovery upper-limit value as time elapses. At least one of the recovery upper-limit value of each item of stock stamina and the recovery rate of each item of stock stamina with the elapse of time may be set on the basis of the kind of a specific item. Furthermore, at least one of the recovery upper-limit value of each item of stock stamina and the recovery rate of each item of stock stamina with the elapse of time may be set in accordance with a change in the level (status) of a specific item.

With this configuration, since it is possible to recover the main stamina by using new stock stamina associated with a specific item, the range of choice about the method of recovering the main stamina is increased. This increases the degree of freedom about the method for the player to recover the main stamina, which improves convenience concerning the game for the player.

Furthermore, at least one of the recovery upper-limit value of the stock stamina and the recovery rate of the stock stamina with the elapse of time may be changed on the basis of a change in the level (status change) or the like of a specific item. For example, when the level of a specific item becomes higher, the recovery upper-limit value of the stock stamina associated with the specific item having the higher level may be increased or the recovery rate of the stock stamina with the elapse of time may be increased.

Alternatively, at least one of the recovery upper-limit value of the stock stamina and the recovery rate of the stock stamina with the elapse of time may be changed in accordance with a change in the kind of a specific item.

With this configuration, since it is possible to improve the ability to recover the main stamina with the stock stamina, the degree of freedom for the player to recover the main stamina is increased, which enhances the fun and essence of the game.

REFERENCE SIGNS LIST

1 Information processing server
3 Player terminal
11 (31) CPU
13 (33) Memory
14 (34) Bus
15 (35) Input/output interface
16 (36) Input unit
17 (37) Output unit
18 (38) Storage unit
19 (39) Communication unit
111, 311 Information processing unit
113 Game execution unit
115 First recovery unit
117 Second recovery unit
119 Instructed recovery unit
121 Parameter conversion unit
123 Parameter generation unit
313 Operation-information accepting unit
315 Game running unit

What is claimed is:

1. A non-transitory computer readable medium comprising an information processing program, the information processing program, when executed by a computer, is configured to perform a method comprising:
consuming a first parameter to execute a first electronic game operating on a player terminal in response to determining, based on the first parameter, that execution of the first electronic game is possible on the player terminal;
recovering the first parameter up to a first recovery upper-limit value as time elapses;
recovering a second parameter, which is different from the first parameter, up to a second recovery upper-limit value as time elapses;
consuming, in response to an instruction from a player using an input device connected to the player terminal and the instruction being accepted by an information processing server, the second parameter to execute a second electronic game operating on the player terminal using a second parameter consumption amount based on a current amount of the second parameter, wherein the first electronic game and the second electronic game are managed by the information processing server and output to one or more game screens on the player terminal; and
recovering the first parameter based on the second parameter consumption amount,
wherein the first parameter corresponds to an amount of stamina for a game character in the first electronic game,
wherein the amount of stamina is increased based on the second parameter consumption amount in the second electronic game, and
wherein the first electronic game and the second electronic game are different games.

2. The non-transitory computer readable medium according to claim 1, wherein the second parameter is managed in the second electronic game that can be executed without consuming the first parameter and that differs in kind from the first electronic game.

3. The non-transitory computer readable medium according to claim 1, wherein a recovery rate of the second parameter with the elapse of time is lower than the recovery rate of the first parameter with the elapse of time.

4. The non-transitory computer readable medium according to claim 1, wherein the method further comprises:
generating the second parameter corresponding to a specific item based on the specific item.

5. The non-transitory computer readable medium according to claim 4, wherein at least one of the second recovery upper-limit value and a recovery rate of the second parameter with the elapse of time is changed in accordance with a change in a status of the specific item.

6. An information processing server comprising:
a computer processor; and
a memory coupled to the computer processor, wherein the memory comprises a computer program configured to perform a method comprising:
consuming a first parameter to execute a first electronic game operating on a player terminal in response to determining, based on the first parameter that execution of the first electronic game is possible on the player terminal;
recovering the first parameter up to a first recovery upper-limit value as time elapses;
recovering a second parameter, which is different from the first parameter, up to a second recovery upper-limit value as time elapses;
consuming, in response to an instruction from a player using an input device connected to the player terminal and the instruction being accepted, the second parameter to execute a second electronic game operating on the player terminal using a second parameter consumption amount based on a current amount of the second parameter;
managing the first electronic game and the second electronic game;
outputting the first electronic game and the second electronic game to one or more game screens on the player terminal; and
recovering the first parameter based on the second parameter consumption amount,
wherein the first parameter corresponds to an amount of stamina for a game character in the first electronic game,
wherein the amount of stamina is increased based on the second parameter consumption amount in the second electronic game, and wherein the first electronic game and the second electronic game are different games.

7. An information processing system comprising:
a player terminal;
an input device connected to the player terminal; and
an information processing server communicatively connected to the player terminal,
wherein the player terminal is configured to perform a first method comprising:
    accepting an instruction for recovering a first parameter from a player; and
    sending the accepted instruction to the information processing server, and
wherein the information processing server is configured to perform a second method comprising:
    consuming the first parameter to execute a first electronic game operating on the player terminal in response to determining, based on the first parameter that execution of the first electronic game is possible on the player terminal;
    recovering the first parameter up to a first recovery upper-limit value as time elapses;
    recovering a second parameter in a second electronic game, which is different from the first parameter, up to a second recovery upper-limit value as time elapses; and
    consuming, in response to the instruction being accepted, the second parameter using a second parameter consumption amount based on a current amount of the second parameter, wherein the first electronic game and the second electronic game are managed by the information processing server and output to one or more game screens on the player terminal; and
    recovering the first parameter based on the second parameter consumption amount,
wherein the first parameter corresponds to an amount of stamina for a game character in the first electronic game,
wherein the amount of stamina is increased based on the second parameter consumption amount in the second electronic game, and
wherein the first electronic game and the second electronic game are different games.

* * * * *